United States Patent [19]
Ged

[11] 3,853,619
[45] Dec. 10, 1974

[54] METHOD FOR CLEANING AWAY PET STOOLS

[76] Inventor: Agnes P. Ged, 268 67th St., Brooklyn, N.Y. 11220

[22] Filed: Aug. 14, 1973

[21] Appl. No.: 388,194

[52] U.S. Cl............... 134/4, 117/161 R, 119/1, 134/38, 134/42, 252/DIG. 8, 252/106
[51] Int. Cl............................................. B08b 7/00
[58] Field of Search............ 134/4, 38, 42; 252/106, 252/171, DIG. 3, DIG. 8; 260/30.6 R; 119/1; 117/3, 161 R, 161 UC, 161 UB

[56] References Cited
UNITED STATES PATENTS

| | | | |
|---|---|---|---|
| 2,046,886 | 7/1936 | Strain | 260/30.6 R X |
| 2,327,701 | 8/1943 | Ellis et al. | 252/DIG. 8 |
| 2,393,798 | 1/1946 | Morgan et al. | 252/DIG. 8 |
| 2,495,729 | 1/1950 | Hutson et al. | 134/4 |
| 2,934,510 | 4/1960 | Crissey et al. | 260/30.6 R X |
| 2,951,043 | 8/1960 | Blank | 252/171 |
| 3,063,873 | 11/1962 | Saroyan | 134/4 |
| 3,578,499 | 5/1971 | Crotty et al. | 134/4 |

OTHER PUBLICATIONS

The Technology of Solvents and Plasticizers, Doolittle (1954), p. 211.

Primary Examiner—Robert L. Lindsay, Jr.
Assistant Examiner—Marc L. Caroff

[57] ABSTRACT

Acrylic polymer dissolved in methyl ethyl ketone, toluol and tricresyl phosphate is used to clean away pet stools and graffiti. For the former use the composition also contains a bactericide. For both uses, pine oil is a desirable constituent. In the cleaning away of pet stools the composition serves to harden the stools and thereby facilitates their physical removal from pavements.

3 Claims, No Drawings

METHOD FOR CLEANING AWAY PET STOOLS

This invention relates to a cleaning composition which is particularly useful for removing pet stools from pavements and graffiti from painted surfaces without removing any underlying paint.

Pet stools on pavements are a continual nuisance to city residents. In recent years, city environments have also been damaged by graffiti inscribed on the surfaces of buildings, buses, subway trains, subway stations and so on by means of marking pens and spray cans of paint. Hence, there is a need for a cleaning composition to enable the removal of pet stools from pavements in a relatively sanitary, non-objectionable manner; and there is also a need for a composition for cleaning graffiti from the surfaces on which they are inscribed and, moreover, to do so without damaging any underlying decorative paint coating on the surface.

According to the present invention, there is provided a composition meeting both needs. The composition is comprised of the solvents methyl ethyl ketone, toluol and tricresyl phosphate, and an acrylic polymer. Any conventional film-forming acrylic polymer may be employed, such as homopolymers and copolymers of methyl acrylate, ethyl acrylate, methyl methacrylate, methyl ethacrylate, ethyl methyacrylate, ethyl ethacrylate, optionally together with acrylic acid, acrylonitrile, and the like. When the composition is to be used for cleaning pet stools, it is also to contain a bactericide, such as of the quaternary ammonium type. The composition may also contain raw pine oil, which imparts a pleasant scent and also has some solvent action. If desired, a very small proportion of a colorant, such as a vegetable dye, may be incorporated to impart a pleasant color to the mixture.

For convenience of application, it may be desired to package the composition as an aerosol spray. For that purpose, a conventional propellant in the form of an inert gas may be employed, such as a fluorinated hydrocarbon or nitrogen.

Preferred weight proportions in the mixture are about 30 to about 50 parts toluol, about 45 to about 65 parts methyl ethyl ketone and about 1 to about 5 parts tricresyl phosphate. The proportion of the acrylic polymer is highly variable from polymer to polymer and is most precisely stated as being such as will form a film upon evaporation of the solvent system. Typically, that proportion will be at least 1 part by weight per 100 parts by weight of the solvent system. The upper limit will generally be on the order of about 30 parts by weight on the same basis. The proportion of bactericide, if used, will generally be on the order of about 0.01 to about 1 part by weight per 100 parts by weight of the entire formulation. The proportion of pine oil, if used, will generally be on the order of about 0.1 to about 5 parts by weight per 100 parts by weight of the entire formulation. The proportion of aerosol propellant, if used, is so highly variable and well within the skill of the art in any particular instance that no useful purpose would be served by attempting to generalize. If aerosol packaging is not employed, a pump type dispenser can be convenient.

When the composition of the invention is applied to pet stools, the stools are hardened by formation of the acrylic polymer film. It is thus made possible to neatly scoop the stools from the pavement or sweep the stools away. Moreover, the stools are deodorized and disinfected and dogs are discouraged from sniffing the stools by application of the composition.

For the removal of graffiti, the preferred method is to wipe the area to be cleaned with cold water immediately after application thereto of the composition. If one waits, a film of the acrylic polymer forms which, however, can be peeled off, effecting simultaneous removal of the graffiti.

An exemplary composition of the invention is the following mixture:

| Ingredient | | Parts, by weight |
|---|---|---|
| Acryloid A-101 | (40% by weight acrylic polymer in methyl ethyl ketone) | 15 |
| Tricresyl phosphate | | 1.5 |
| Hyamine 1622 (quaternary ammonium bactericide) | | 0.2 |
| Raw pine oil | | 0.5 |
| Toluol | | 40 |
| Methyl ethyl ketone | | 45 |

For aerosol packaging, the aerosol can is filled with the above mixture and Freon-12 in equal weight proportions.

The compositions of the invention are highly effective for their intended uses, inexpensive, safe to handle and relatively non-toxic.

What is claimed is:

1. Method of cleaning away pet stools, comprising applying to the pet stools a cleaning composition comprising a solution of a film-forming acrylic polymer in a mixture of about 45 to about 65 parts methyl ethyl ketone, about 30 to about 50 parts toluol and about 1 to about 5 parts tricresyl phosphate, all by weight, and a bactericide, the solution containing about 1 to about 30 parts by weight of the acrylic polymer per 100 parts by weight of the mixture of methyl ethyl ketone, toluol and tricresyl phosphate, permitting the composition to harden the stools, and physically removing the stools.

2. Method according to claim 1, in which the composition further comprises pine oil.

3. Method according to claim 2, in which the composition contains about 0.1 to about 5 parts by weight of the pine oil per 100 parts by weight of the composition.

* * * * *